(12) United States Patent
Wolff et al.

(10) Patent No.: US 11,639,159 B2
(45) Date of Patent: May 2, 2023

(54) METHOD AND DEVICE FOR OPERATING AN AUTOMATED PARKING BRAKE

(71) Applicant: Robert Bosch GmbH, Stuttgart (DE)

(72) Inventors: Helmut Wolff, Untergruppenbach (DE); Edith Mannherz, Kanagawa (JP)

(73) Assignee: Robert Bosch GmbH, Stuttgart (DE)

(*) Notice: Subject to any disclaimer, the term of this patent is extended or adjusted under 35 U.S.C. 154(b) by 632 days.

(21) Appl. No.: 16/617,228

(22) PCT Filed: May 28, 2018

(86) PCT No.: PCT/EP2018/063911
§ 371 (c)(1),
(2) Date: Nov. 26, 2019

(87) PCT Pub. No.: WO2019/001868
PCT Pub. Date: Jan. 3, 2019

(65) Prior Publication Data
US 2020/0086834 A1 Mar. 19, 2020

(30) Foreign Application Priority Data

Jun. 28, 2017 (DE) .................. 10 2017 210 893.2

(51) Int. Cl.
*B60T 13/00* (2006.01)
*B60T 7/12* (2006.01)
(Continued)

(52) U.S. Cl.
CPC .............. *B60T 7/12* (2013.01); *B60T 13/741* (2013.01); *B60T 13/588* (2013.01); *B60T 13/662* (2013.01);
(Continued)

(58) Field of Classification Search
CPC . B60T 7/12; B60T 8/171; B60T 8/172; B60T 13/588; B60T 13/662;
(Continued)

(56) References Cited

U.S. PATENT DOCUMENTS 6,464,308 B2 * 10/2002 Kubota ................. B60T 13/741
303/3
6,536,562 B1 * 3/2003 Bohm ..................... F16D 65/56
188/71.7
(Continued)

FOREIGN PATENT DOCUMENTS

CN 106167007 A 11/2016
DE 10 2005 011 267 A1 3/2006
(Continued)

OTHER PUBLICATIONS

Machine translation of JP 2001-225741 (no date).*
(Continued)

*Primary Examiner* — Nicholas J Lane
(74) *Attorney, Agent, or Firm* — Maginot, Moore & Beck LLP (57) ABSTRACT

Disclosed is a method for operating an automated parking brake for a motor vehicle comprising at least one braking mechanism with a brake piston. In said method, the parking brake moves the brake piston by means of an actuator between an idle position, in which the brake piston applies no braking moment, and a braking position, in which the brake piston applies a braking moment, in relation to a brake disk, and during a disengagement process of the parking brake, a reference point is determined in which the brake piston is located in a position in which it applies substantially no braking moment and which is between its idle position and its braking position. The method according to the disclosure is characterized in that the reference point is
(Continued)

estimated taking into account an extrapolation of a variable describing the disengagement process.

14 Claims, 4 Drawing Sheets

(51) Int. Cl.
  *B60T 13/74* (2006.01)
  *B60T 13/58* (2006.01)
  *B60T 13/66* (2006.01)
  *F16D 121/24* (2012.01)
  *F16D 123/00* (2012.01)

(52) U.S. Cl.
  CPC ......... *B60T 13/746* (2013.01); *F16D 2121/24* (2013.01); *F16D 2123/00* (2013.01)

(58) Field of Classification Search
  CPC .. B60T 13/741; B60T 13/746; B60T 2250/06; F16D 2121/24; F16D 2123/00
  See application file for complete search history.

(56) References Cited

U.S. PATENT DOCUMENTS

| | | | | |
|---|---|---|---|---|
| 9,469,288 | B2* | 10/2016 | Sussek | F16D 65/18 |
| 2005/0035653 | A1* | 2/2005 | Godlewsky | B60T 13/662 |
| | | | | 303/122.03 |
| 2006/0219486 | A1* | 10/2006 | Wagner | F16D 65/567 |
| | | | | 188/1.11 L |
| 2007/0240947 | A1* | 10/2007 | Goss | B60T 7/107 |
| | | | | 188/158 |
| 2009/0218179 | A1* | 9/2009 | Yokoyama | F16D 65/18 |
| | | | | 188/1.11 L |
| 2010/0308645 | A1 | 12/2010 | Maron et al. | |
| 2011/0042171 | A1 | 2/2011 | Knechtges | |
| 2012/0193177 | A1* | 8/2012 | Goto | F16D 65/18 |
| | | | | 188/161 |
| 2018/0056951 | A1* | 3/2018 | Baehrle-Miller | B60T 13/746 |
| 2021/0197777 | A1* | 7/2021 | Itakura | B60T 1/065 |

FOREIGN PATENT DOCUMENTS

| | | | |
|---|---|---|---|
| DE | 10 2016 208 583 A1 | | 11/2016 |
| JP | 2001225741 A | * | 8/2001 |
| JP | 2005-527420 A | | 9/2005 |
| JP | 2007-147081 A | | 6/2007 |
| WO | 2010/097938 A1 | | 9/2010 |
| WO | 2016/188899 A1 | | 12/2016 |

OTHER PUBLICATIONS

International Search Report corresponding to PCT Application No. PCT/EP2018/063911, dated Sep. 6, 2018 (German and English language document) (5 pages).

* cited by examiner

METHOD AND DEVICE FOR OPERATING AN AUTOMATED PARKING BRAKE

This application is a 35 U.S.C. § 371 National Stage Application of PCT/EP2018/063911, filed on May 28, 2018, which claims the benefit of priority to Serial No. DE 10 2017 210 893.2, filed on Jun. 28, 2017 in Germany, the disclosures of which are incorporated herein by reference in their entirety.

The present disclosure relates to a method for operating an automated parking brake for a motor vehicle having at least one brake device with a brake piston, wherein the parking brake adjusts the brake piston between an idle position which is free of braking torque and a braking position in which a braking torque is applied, with respect to a brake disk by means of an actuator, wherein during a process of releasing the parking brake a reference point is determined at which the brake piston is located at position at which it is essentially free of braking torque, between its idle position and braking position, wherein the method is characterized in that a reference point is estimated taking into account an extrapolation of a variable which describes the release process.

BACKGROUND

Automatic parking brakes which can continuously hold a vehicle in a stationary state are known from the current prior art. Furthermore, it is known that a vehicle can also be decelerated at high speeds by means of the parking brake actuator if, for example, the hydraulic brake system has failed and the driver pulls the parking brake switch. With new functions which also permit automated driving maneuvers at low speeds (such as e.g. highly automated parking maneuvers/parking pace-exiting maneuvers), automated parking brakes are increasingly also used as a backup for any hydraulic faults. Since, in comparison with a hydraulic brake actuator, an automated parking brake takes a very long time until a braking force is effective (owing to the idle travel/clearance, of the parking brake actuator which is set for the driving mode, in order to avoid influencing the hydraulic brake system) it is possible to shorten this idle travel before the start of a function which would like to use the parking brake as a backup. This requires, on the one hand, a very precise travel estimation of the travel of the parking brake actuator, and on the other hand a reference point is defined (for example the so-called "touch point"—that is the point at which the idle phase changes into the clamping force buildup phase, correspondingly analogous in the case of release).

For example patent application DE 10 2016 208 583 A1 is known from the prior art. Said document relates to a method for operating an automated parking brake for a motor vehicle having at least one brake device, wherein the parking brake can assume at least two states, wherein in a first state no clamping force is built up by means of the parking brake, and in a second state a clamping force is built up by means of the parking brake, wherein a transition point defines the transition between the two states, is characterized in that the transition point is identified during the process of releasing the parking brake. The disclosure also relates to a corresponding configured control unit and to an associated parking brake.

According to the current prior art, when the transition point is determined, recourse is frequently made to the measurement of the current and voltage of the parking brake actuators. It is problematic here that, depending on the temperature and voltage the current profiles can be very different, in particular in the non-linear region around the actual touch point. Particularly in the case of high voltages, the problem additionally arises that the parking brake actuators are relatively fast and therefore complicated calculation formulas for determining the inflection point simply detect the point too late owing to their long computing time. In addition, currently known touch point detection methods calculate the touch point only at the moment when it is being passed through or else only subsequently.

SUMMARY

In contrast, the method according to the disclosure advantageously permits the touch point to be determined, which touch point is based on very simple computational rules and can therefore be calculated very quickly. In addition, when release occurs, the touch point can be calculated even before the clamping force of the actuator is completely eliminated. Depending on the precision requirement, this method can therefore be used to determine the touch point or to delimit the area in which the touch point lies.

This is made possible according to the disclosure by the features disclosed herein. Further refinements of the disclosure are the subject of the embodiments.

The method according to the disclosure for operating an automated parking brake for a motor vehicle having at least one brake device with a brake piston, wherein the parking brake adjusts the brake piston between an idle position which is free of braking torque and a braking position in which a braking torque is applied, with respect to a brake disk by means of an actuator, wherein during a process of releasing the parking brake a reference point is determined at which the brake piston is located at position at which it is essentially free of braking torque, between its idle position and braking position, is characterized in that the reference point is estimated taking into account an extrapolation of a variable which describes the release process.

This is understood as meaning that a status of the parking brake which satisfies a defined condition, made of the reference point, is determined. For example, a determined position can be understood to be a reference point at which the parking brake exerts a specific effect, for example a force-free application of the brake piston against the brake disk. However, as a result of the proposed solution there is no checking as to whether this condition is satisfied or has been satisfied, for example at the present point in time. That said, the future time at which this condition will be satisfied is estimated. There is then essentially no precise determination of an actual instance of it being satisfied but instead a relatively coarse estimation of a possible future instance of it being satisfied. For this, a variable which describes the release process, such as for example the force profile, the motor current and/or the time of actuation of the actuator, is analyzed. For example, in this way it is possible to determine a brake contact point. A brake contact point is understood to be the position of the parking brake (for example of the brake piston) at which the parking brake (for example the brake piston) bears against the brake disk essentially without force and without play. Within the scope of the embodiments, the terms braking torque and clamping force are to be understood as being equivalent. The estimation of the reference point can be carried out here by means of a direct estimation of the time or the time period when the reference point (or braking contact point) is reached. It is therefore also possible to estimate the absolute or relative position of the reference point (for example braking contact point).

From this it is in turn possible to estimate when the braking contact point may be reached, in comparison with the determined and/or known current position and (extrapolated) movement.

Such not an extrapolation advantageously be made possible by means of simple computational rules. This permits a saving in terms of computing capacity. Furthermore, it is as a result also possible for very rapid calculation to take place. Furthermore, the extrapolation makes possible early estimation of the reference point already in advance before the actuator reaches the actual position. This makes it possible to influence the control of the parking brake in good time. For example, the control can be switched off in good time, in order to permit positioning very close to the desired reference point.

In one advantageous embodiment, the method is characterized in that the reference point is estimated taking into account a linear extrapolation of the variable which describes the release process.

This is understood as meaning that the release process is approximated by means of a linear approximation in order to be able to model said process in a simplified way. For this purpose, it is assumed that the variable which describes the release process exhibits linearity. This can also be defined, for example, only over a specific range. Taking this as a basis, mathematical modeling of the current situation and linear progression are carried out in order to determine the desired reference point. Such linear extrapolation can advantageously be implemented by means of simple computational rules. As a result, only small computing capacities are necessary for the calculation. Furthermore, a rapid calculation is possible.

In one possible refinement the method is characterized in that the variable which describes the release process represents the reduction in clamping force. This is understood as meaning that the clamping force can be derived from the analyzed variable in a direct or indirect fashion. The analyzed variable therefore relates to the function (for example time profile) of the reduction in clamping force. In order to permit this, it is, of course, also possible to take into account a plurality of variables or factors. A direct coupling with which the relevant technical effect can be made possible advantageously by the selection of a suitable variable being analyzed, for example the parking brake is placed in a position in which an operating position of the parking brake occurs which is defined or is free of braking torque.

In one preferred embodiment, the method is characterized in that the release process is described by at least one value pair of two variables, wherein in particular the variables are taken into account as a value pair:
 a current value of the parking brake and
 a variable of the parking brake which describes the current position of the brake piston.

This is understood as meaning that the variable which describes the release process is formed by a plurality of variables, for example by the deflection of the parking brake and the associated current value. The value pair which is formed from the two variables is therefore to be understood as being a reference value which completely describes, for example, the current state of the release process. The deflection of the parking brake can be the position of a component for example of a brake piston or of the spindle nut. For example, the position can also be determined by means of the rotational angle of the actuator or the actuation time. Advantageously very precise determination of the state of the parking brake for example the position of the brake piston can be carried out by using the described variables.

In an alternative development, the method is characterized in that the following variables are taken into account as a value pair: a current value of the parking brake and a time value of actuation of the actuator.

Figure 3:
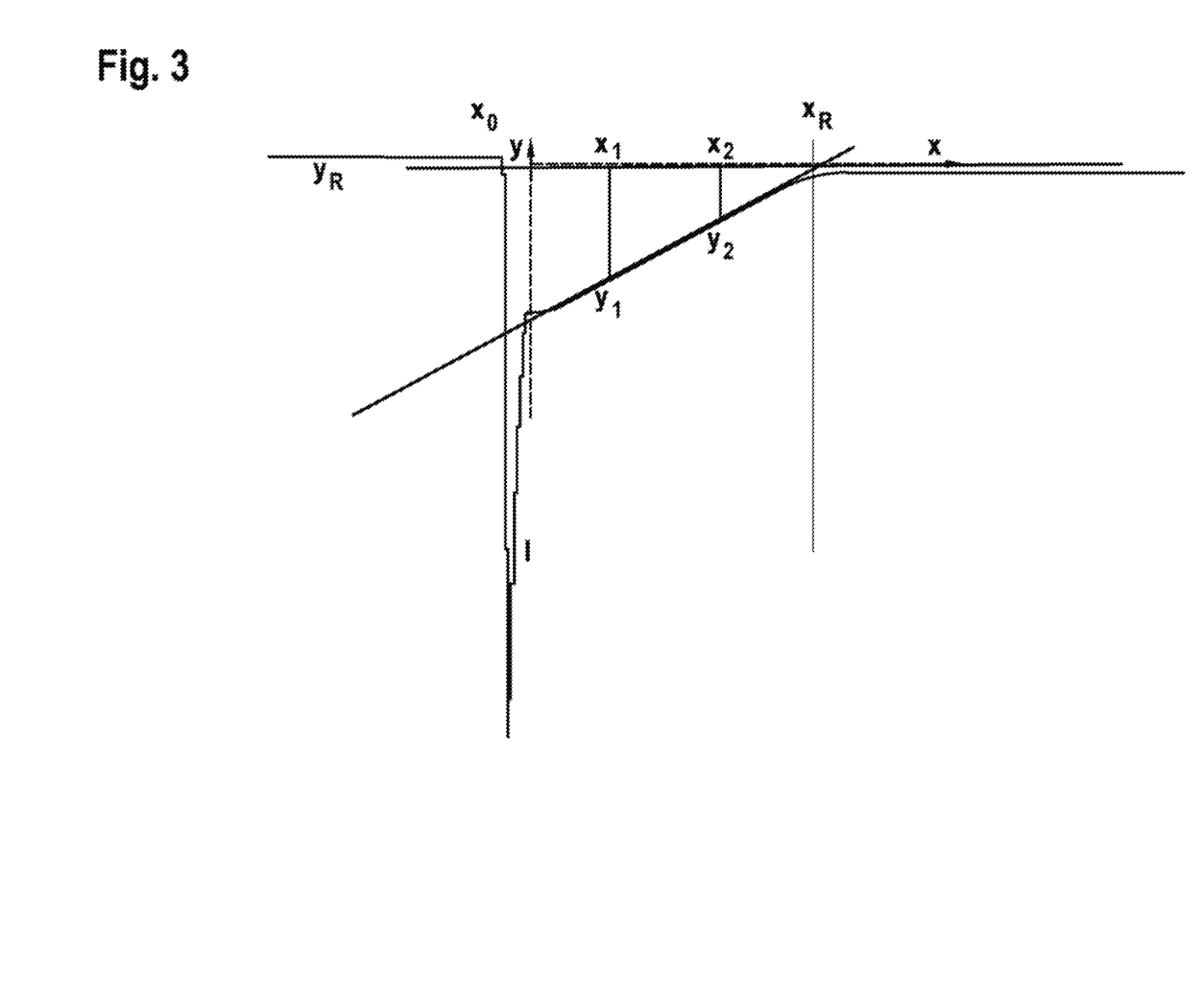
FIG. 3 shows an illustration of the motor current according to the actuator plotted over the time according to one embodiment.

This is to be understood as meaning that a value pair is formed from the variables of the current and the time. For example the current value which occurs at a specific point in time. As a result, recourse can advantageously be made to measurement variables which are already available. There is therefore no need for any additional sensors. This reduces the expenditure, the complexity and the costs of the system. For the purpose of illustration, a sketch with two reference point pairs for the variables of the current value and time is shown in FIG. 3.

It is explicitly noted that the value pair takes into account not only the abovementioned variables but also can be formed directly from the specified variables, or can be composed of them.

In one advantageous refinement, the method is characterized in that in order to determine the value pair the corresponding current values are determined at defined time values, or the corresponding time values are determined at defined current values.

This is understood as meaning that values are defined for a variable at which the values of the other variable are determined, in particular measured directly. For example, time values can be defined at which the corresponding current values are to be measured. The time values are advantageously selected here in accordance with the switch-on peak. That is to say the time values are selected such that they do not lie, for example, in the non-linear region of the switch-on peak but rather in the linear region of the regular reduction in clamping force following the latter. By virtue of the time values which are defined in this way it is possible to determine the current values very easily with a precision level which is sufficient for many cases. In one alternative embodiment, it is also possible to determine the respective time values at defined current values. This permits a very high level of precision owing to the existing correlation (of defined current values) with the reduction in force. This procedure also permits ambient conditions to be taken into account, said conditions possibly causing the reduction in clamping force to occur more quickly or more slowly. This also permits the avoidance of current values which do not lie in the non-linear range. In addition, a possible admission pressure can be taken into account, for example during the definition of the current values. Relatively low current values are advantageously defined in accordance with the admission pressure. As a result, it is possible, for example to take into account that, for example, a specific current value is not reached at all any longer when there is a high admission pressure.

In one possible embodiment, the method is characterized in that the reference point is estimated taking into account a linear extrapolation of two value pairs of the variables which describes the release process.

This is understood as meaning that two value pairs are determined (for example two measured current values are determined at two defined points in time). A linear extrapolation is carried out on the basis of these value pairs. This linear extrapolation can be modeled mathematically by setting up a linear equation. Very easy calculation of the linearization can be advantageously carried out therewith. In this way, the further, i.e. future, release process can be approximated with low expenditure and few resources.

In one preferred development, the method is characterized in that the position at which the extrapolation of the variable which describes the release process has a defined reference value is assumed as the reference point.

This is understood as meaning that the reference point is obtained by means of extrapolation of a variable, wherein the reference point is assumed precisely there where the variable reaches a defined value. According to the present embodiment for estimating the reference point, for example the current/time value pair can be extrapolated linearly until the current value reaches a specific value. The point in time corresponding to the current value could then be defined as a reference point. The defined reference value of the variable can have either an actual value or the value zero. The value zero would correspond in the graphic description of the linearization as a straight line to a zero crossover, for example of the X axis. The use of a defined reference value permits a very high level of precision when determining the respectively desired reference point during the release process. Furthermore, this procedure also permits a high level of variability as a result of the definition of specific changed reference values depending on the requirements in the particular case.

In one alternative embodiment, the method is characterized in that the reference point is estimated taking into account an open-circuit current of the actuator, wherein in particular the open-circuit current is determined in advance of the estimation of the reference point, by means of
 a defined fixed parameter and/or
 a measured parameter and/or
 a defined variable parameter, wherein in particular another defined parameter is taken into account on the basis of different determined operating conditions.

This is understood as meaning that the open-circuit current is also taken into account during the determination of the reference point. For example, this open-circuit current can be integrated into the determination by means of the reference value described above. For this, for example the reference value which describes the zero crossover of the approximated straight line (linearization) is fixed at the assumed open-circuit current. The reference value may have been defined in advance as a fixed value for this. Alternatively or in combination the reference value can also correspond to a measured parameter, for example to the actually measured open-circuit current at the last release process. The open-circuit current is particularly advantageously learnt over a multiplicity of preceding applications. For example, for this the respective open-circuit current is determined over the last 100 applications of the parking brake, and the average (or a weighted average) formed with respect thereto. It is also possible for the reference value to be defined in a variable fashion. That is to say, for example, a so-called look-up table is defined in which the value for the reference value for different operation conditions is defined. The respective reference value is extracted from the table and used in the calculation in accordance with the currently present operating conditions. This approach advantageously permits improved accuracy and variability during the determination of the reference point, and furthermore simple calculation.

In one advantageous refinement, the method is characterized in that after complete elimination of the braking torque an actually existing open-circuit current is measured, and in particular the estimated reference point is corrected if the open-circuit current determined in advance of the estimation of the reference point deviates from the actually existing open-circuit current.

This is understood as meaning that the assumed open-circuit current value is validated. In order to be able to carry out this validation, the actually present open-circuit current value is determined within the scope of the release process of the parking brake. If the assumed open-circuit current value deviates from the determined open-circuit current value by more than a defined extent, a correction is carried out. This correction can comprise the assumed open-circuit current value as well as the approximated reference point. This results in an improvement of the estimation of the reference point.

However, since the actual open-circuit current can only be determined in the idle phase, a very early detection of the reference point is not possible therefore, but, owing to the subsequent correction, for example more accurate positioning is possible when the parking brake actuator is actuated again at the reference point.

In one possible embodiment, the method is characterized in that in order to estimate the reference point a plurality of extrapolations of the variable which describes the release process are carried out, in particular in that a mean value of a plurality of linear extrapolations of two value pairs of the variables which describe the release process is formed.

Figure 4:
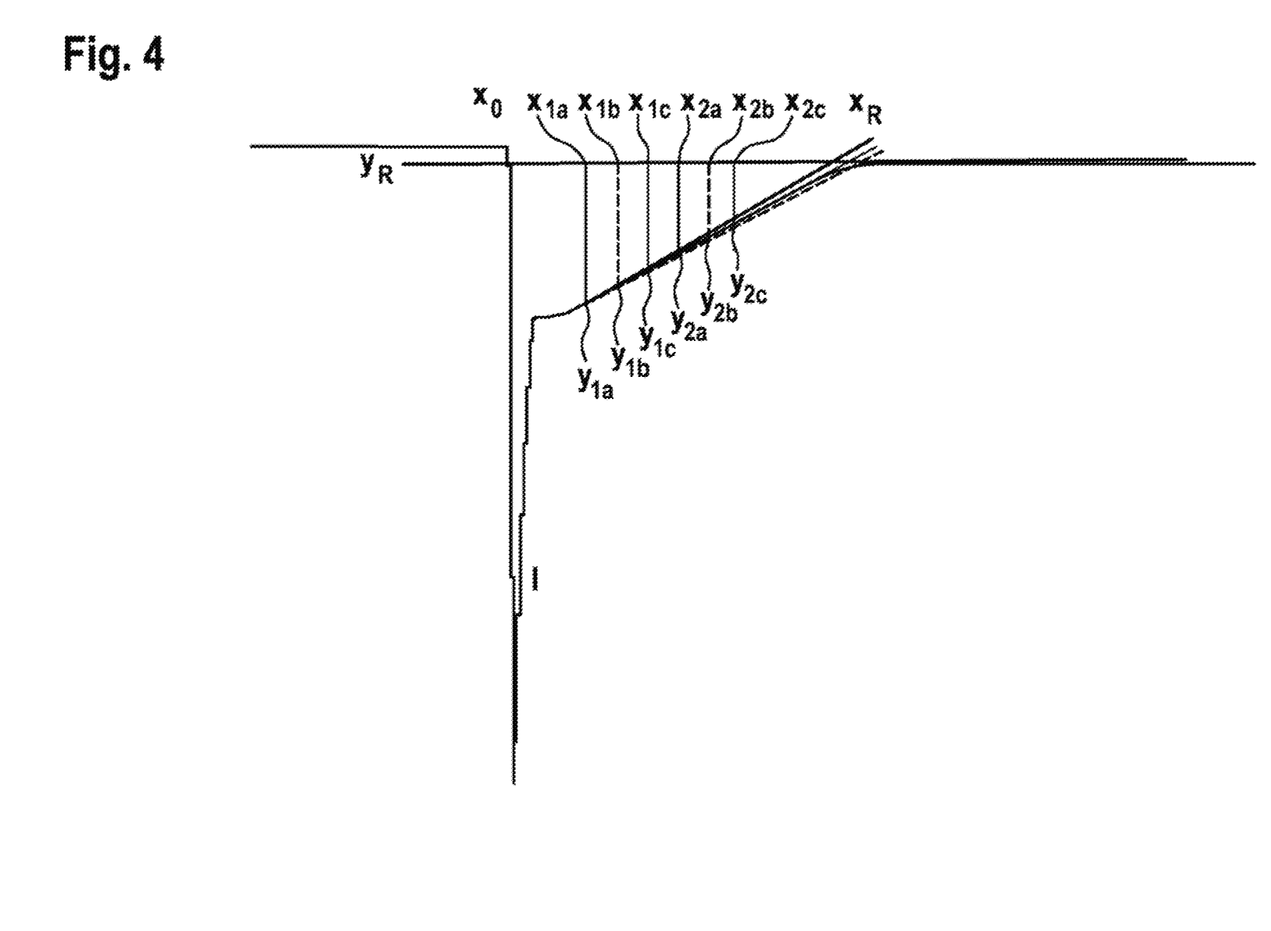
FIG. 4 shows an illustration of the motor current according to the actuator plotted over the time according to a further embodiment.

This is understood as meaning that viewed in graphic terms not only is one extrapolating straight line formed but rather a plurality of extrapolating straight lines are determined. Each of the straight lines can, as already described above, be formed, for example, by means of two current values of the actuator at two defined time values. For two straight lines, preferably different time values are defined so that in each case different value pairs occur. In accordance with the different straight lines, different reference points are obtained. The approximated reference point for the release process can be defined as a mean value of the determined reference points. Alternatively it is of course also conceivable that weighting of the determined reference points or even weighting of the respective value pairs takes place (for example on the basis of prioritization/weighting of corresponding time values). The precision of the estimation method is advantageously improved by taking into account a plurality of extrapolations. This method has the advantage that if one of the reference points has an outlier, this does not give rise to an incorrect calculation of the touch point. For the purpose of illustration, an outline with three reference point pairs is shown in FIG. 4.

In one preferred refinement, the method is characterized in that the estimated reference point is set as input variable for a calculation method for accurate determination of the reference point.

This is understood as meaning that the described estimation method is used, for example, for approximate delimitation of the actual braking contact point, and a detailed calculation method of the braking contact point occurs subsequent to and/or on the basis of the estimation method. The determination of the reference point is therefore carried out by means of a determination method which is divided in two. Firstly, an estimation occurs. In the estimated, i.e. in the expected, range in which the reference point lies, a highly accurate calculation method is then used. By using the simple estimation in advance it is possible to permit optimized use of the calculation capacities, since the estimation method only takes up few resources. The calculation-intense precise determination of the reference point correspondingly does not have to be carried out over the entire range of the release process but rather only in the narrow range of the estimated approximate position of the reference point.

The method advantageously also provides for the storage of the reference point before for later use during the control of the parking brake. Furthermore, the method provides for the parking brake to be controlled on the basis of the estimated and/or determined reference point or braking contact point. In this context, for example, the brake piston can be positioned at the reference point. A positioning with an offset is also possible. Positioning can be carried out, for example, when automated driving functions, for example of an automated parking assistant, are activated.

According to the disclosure, a device is also provided which is configured to carry out the described method.

This is understood to mean that the device is designed, that is to say configured and/or has means, for carrying out, in the case of appropriate use, a method which is as described above. The device can be assumed to be, for example, a control unit and/or a memory element and/or an operator control element. Therefore, for example an ESP control unit or APB control unit which carries out control and/or estimation of the reference point taking into account an extrapolation of a variable which describes the release process.

According to the disclosure, a computer program is also provided which is configured to carry out the method described, and a machine-readable storage medium in which the computer program is stored.

BRIEF DESCRIPTION OF THE DRAWINGS

It is to be noted that the features specified individually in the description can be combined with one another in any desired technically appropriate way and disclose further refinements of the disclosure. Further features and expediency of the disclosure can be found in the description of the exemplary embodiments with reference to the appended figures, of which.

DETAILED DESCRIPTION

Figure 1:
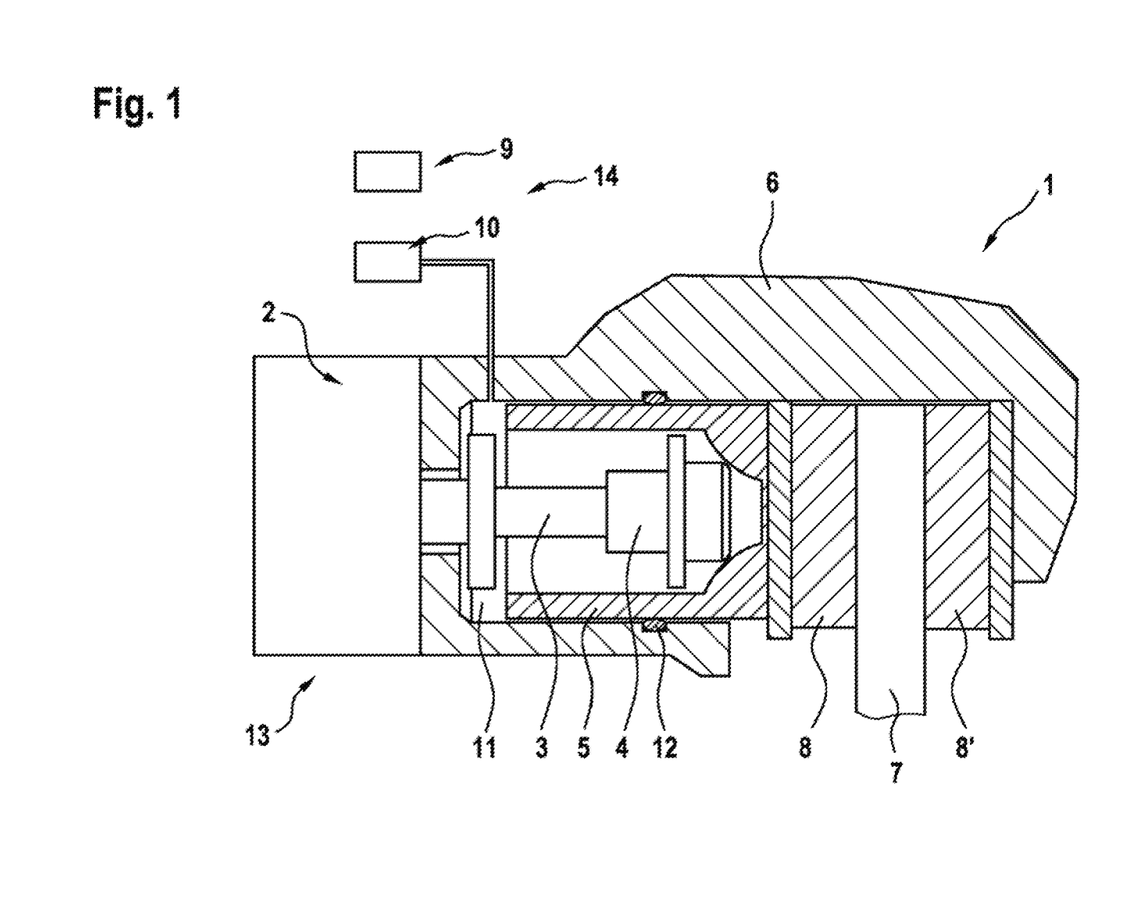
FIG. 1 shows a schematic sectional view of a brake device having an automatic parking brake of an "motor on caliper" design.

FIG. 1 shows a schematic sectional view of a brake device 1 for a vehicle. The brake device 1 has here an automated parking brake 13 (also referred to as an automatic parking brake, APB for short) which can apply a clamping force for arresting the vehicle by means of an electromechanical actuator 2 (electric motor). A brake system frequently comprises two parking brakes 13, each with an electromechanical actuator 2. The parking brakes are frequently arranged on the rear axis, wherein in each case a parking brake 13 is positioned on the left-hand and right-hand brake device 1.

The electromechanical actuator 2 of the illustrated parking brake 13 drives for this a spindle 3 which is mounted in an axial direction, in particular a threaded spindle 3. At its end facing away from the actuator 2, the spindle 3 is provided with a spindle nut 4 which bears against the brake piston 5 in the applied state of the automated parking brake 13. The parking brake 13 in this way transmits a force to the brake linings 8, 8' or the brake disk 7. The spindle nut bears here against an inner end face of the brake piston 5 (also referred to as the rear face of the brake piston head or inner piston head). The spindle nut 4 is shifted in the axial direction in the case of a rotational movement of the actuator 2 and resulting rotational movement of the spindle 3. The spindle nut 4 and the brake piston 5 are mounted in a brake caliper 6 which engages over a brake disk 7 in a pincer-like fashion.

A brake lining 8, 8' is arranged on each side of the brake disk 7. In the case of an application process of the brake device 1 by means of the automated parking brake 13, the electric motor (actuator 2) rotates, after which the spindle nut 4 and the brake piston 5 are moved in the axial direction toward the brake disk 7, in order thereby to generate a predetermined clamping force between the brake linings 8, 8' and the brake disk 7. Owing to the spindle drive and the self-locking which is associated therewith, a forces generated at the parking brake 13 by means of actuation of the electric motor is also maintained when the actuation ends.

The automated parking brake 13 is embodied, for example, as depicted as a motor-on-caliper system and is combined with the service brake 14. The parking brake 13 can also be considered to be integrated into the system of the service brake 14. Both the automated parking brake 13 and the service brake 14 engage here on the same brake piston 5 and the same brake caliper 6, in order to build up a braking force on the brake disk 7. However, the service brake 14 has a separate hydraulic actuator 10 for example a foot brake pedal with a brake booster. The service brake 14 is configured in FIG. 1 as a hydraulic system, wherein the hydraulic actuator 10 can be supported by the ESP pump or an electromechanical brake booster (for example Bosch iBooster) or can be implemented thereby. Further embodiments of the actuator 10 are also conceivable, for example in the form of what is referred to as an IPB (Integrated Power Brake) which basically constitutes a brake-by-wire system in which a plunger is used to build up hydraulic pressure. In the case of service braking, a predetermined clamping force is built up hydraulically between the brake linings 8, 8' and the brake disk 7. In order to build up a braking force by means of the hydraulic service brake 14, a medium 11, in particular an essentially non-compressible brake fluid 11, is pressed into the fluid space which is bounded by the brake piston 5 and the brake caliper 6. The brake piston 5 is sealed with respect to the surroundings by means of a piston sealing ring 12.

The brake actuators 2 and 10 can be actuated by means of one or more output stages, i.e. by means of a control unit 9 which, for example, a control unit of a driving dynamic system such as an ESP (electronic stability program) or some other control unit.

When the automatic parking brake 13 is actuated, the free travel or the clearance must firstly be overcome before a braking force can be built up. Free travel refers here, for example, to the distance which the spindle nut 4 must overcome as a result of the rotation of the spindle 3, in order to move into contact with the brake piston 5. Clearance refers to the distance between the brake linings 8, 8' and the brake disk 7 in the case of disk brake systems of motor vehicles. This process generally lasts for a relatively long time with respect to the overall actuation, in particular in the case of the automated parking brake 13. At the end of such a preparatory phase, the brake linings 8, 8' have come to bear against the brake disk 7 and the build up of force starts in a further method. FIG. 1 shows the state of the already overcome free travel and clearance. Here, the brake linings 8, 8' are applied to the brake disk 7, and when following actuation takes place or the brakes, i.e. the parking brake 13 and the service brake 14, can immediately build up a braking force at the corresponding wheel. The descriptions relating to the clearance apply analogously also to the service brake 14, but owing to the high pressure buildup dynamics the overcoming of free travel takes less time than in the case of the parking brake 13.

Figure 2:
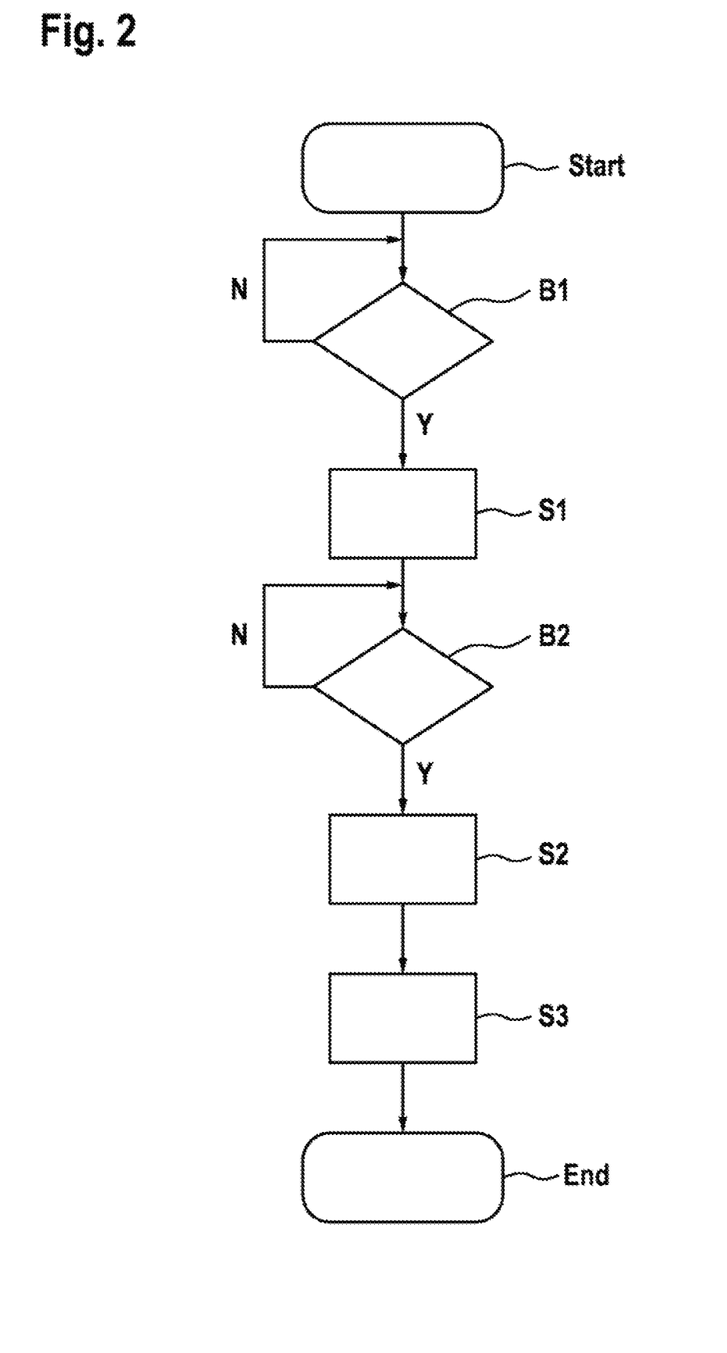
FIG. 2 shows a method sequence corresponding to an embodiment.

FIG. 2 shows a schematic method sequence corresponding to an embodiment the first embodiment. For this purpose, for example the brake contact point is determined by means of a linear extrapolation of two value pairs with the variables "motor current" and "time". After the start of the method, for this firstly the satisfaction of a first condition (B1) is checked for this. This condition is, for example, whether the currently measured current value corresponds to the first defined reference value. If this is the case (Y), the method is continued, and in a first method step (S1) the corresponding time value is stored. If the condition (B1) is not satisfied (N) it is checked further whether the first condition is satisfied in the further time sequence. The satisfaction of a second condition (B2) is checked subsequent to the storage of the first time value. This condition is, for example, whether the currently measured current value corresponds to the second defined reference value. If this is the case (Y), the method is continued, and in a second method step (S2) the corresponding time value is stored. If the condition (B2) is not satisfied (N) it is checked further whether satisfaction of the second condition occurs in the further time sequence. Subsequent to the storage of the second time value, in a next method step (S3) the reference value is estimated. For this purpose, a linear extrapolation is carried out by means of the formula described above, for the two reference values for which the time values were determined, and the time value for the reference point is therefore determined. The estimation method ends with this. The parking brake can be controlled on the basis of the determined time value of the reference point. For example, the release process can be ended in such a way that, for example taking into account the running out of the actuator, the brake piston bears without force and without play against the brake disk. Of course, the determined reference point can also be stored and used, for example, within the scope of a later positioning method of the brake piston.

FIG. 3 shows a schematic illustration of the motor current of the actuator according to one embodiment. In this context the respective time value is determined, for example, for defined current values. A linear extrapolation of the estimation of the time at which the parking brake reaches the reference point takes place on the basis of two value pairs of this variable. The x axis shows here the time profile t, and the y axis shows the motor current l. At the time $x_0$ the actuator is actuated in order to release the parking brake. As a result, a so-called switch-on peak is produced. Subsequent to this, the current profile is reduced over time in a way analogous to the reduction of force. When the first defined current value $y_1$ is reached, the corresponding time $x_1$ is read out and stored in a further course, the corresponding time value $x_2$ is read out and stored when the second defined current value $y_2$ is reached. On the basis of these two value pairs, the time value $x_R$ at which the reference point is expected to be reached with the reference current value $y_R$ is calculated. The calculation corresponds to a linear extrapolation corresponding to a straight line which is extended through the value pairs. The reference point is then reached when this straight line reaches a defined current strength value, for example the open-circuit current value $I_0$. For the sake of this illustration, this open-circuit current value $I_0$ is shown as a horizontal axis $y_R$ in FIG. 3. The reference point $y_R/x_R$ corresponds to the intersection point of this axis with the straight line which has been extended through the value pairs.

As described, the linearization of the current profile occurs in this example using two reference points. For this, it is possible either to select two times (e.g. depending on the switch-on peak) or else two current values. Different values are appropriate here depending on the parking brake actuator. For the purpose of illustration, the following example is described: for example, 3 A is selected as a fixed current value for $y_1$, and 1.5 A for $y_2$. The open-circuit current is 0.5 A in this example, and this value is also to be selected in a actuator-specific fashion. For the x values of the reference points, $x_1$=0.2 s and $x_2$=0.4 s are assumed as determined time values. The gradient m of a straight line can be calculated very easily by means of two known points (formula 1):

$$m=(y2-y1)/(x2-x1)=(-1.5\ A-(-3\ A))/(0.4\ s-0.2\ s)=7.5\ A/s$$

Formula 1: gradient of a straight line

The general function of a straight line is as follows (formula 2):

$$y=m*x+c$$

Formula 2: linear equation

With a known gradient it is possible to calculate the offset c of the linear equation by means of one of the two reference points (formula 3):

$$c=y-m*x=-3\ A-7.5\ A/s*0.2\ s=-4.5\ A$$

Formula 3: calculation of offset c

If the linear equation is known, it is possible to calculate the time of the touch point with the known open-circuit current value (formula 4):

$$x=(y-c)/m=(-0.5\ A-(-4.5\ A))/(7.5\ A/s)=0.53\ s$$

Formula 4: calculation of touch point by means of two reference points

FIG. 4 shows a schematic illustration of the motor current of the actuator according to a further embodiment. The illustration and the procedure behind it correspond essentially to the statements relating to FIG. 3, However, in FIG. 3 only one extrapolation is carried out on the basis of two value pairs ($x_1/y_1$, $x_2/y_2$) of the variables of the motor current (l) and time (t). In contrast to this, in FIG. 4 three extrapolations are carried out or shown. For this purpose, the respective time values $x_{1a}$, $x_{1b}$, $x_{1c}$, $x_{2a}$, $x_{2b}$, $x_{2c}$ are determined at the defined current values $y_{1a}$, $y_{1b}$, $y_{1c}$, $y_{2a}$, $y_{2b}$, $y_{2c}$. Subsequent to this, extrapolation is carried out on the basis of the value pairs $y_{1a}/x_{1a}$ and $y_{2a}/x_{2a}$, and an extrapolation is carried out on the basis of the value pairs $y_{1b}/x_{1b}$ and $y_{2b}/x_{2b}$, as well as an extrapolation on the basis of the value pairs $y_{1c}/x_{1c}$ and $y_{2c}/x_{2c}$. In each case the time value $x_R$ is assumed as the reference time value if the extrapolated straight line reaches the reference current value $y_R$ (in this case the assumed open-circuit current $I_0$). Subsequent to this, the calculated reference time values $x_{Ra}$ are averaged (extrapolation by $y_{1a}/x_{1a}$ and $y_{2a}/x_{2a}$ to $y_R$), $x_{Rb}$ (extrapolation by $y_{1b}/x_{1b}$ and $y_{2b}/x_{2b}$ to $y_R$) and $x_{Rc}$ (extrapolation by $y_{1c}/x_{1c}$ and $y_{2c}/x_{2c}$ to $y_R$) in order to calculate the average reference current value $x_R$ and estimate the reference point $y_R/x_R$.

The invention claimed is:

1. A method for operating an automated parking brake for a motor vehicle including at least one brake device having a brake piston, the method comprising:

adjusting, with an actuator, the brake piston between an idle position that is free of braking torque and a braking position at which braking torque is applied to a brake disk; and determining, during a process of releasing the automated parking brake, a reference point at which the brake piston is located at a position between the idle position and the braking position that is essentially free of braking torque, wherein determining the reference point comprises determining an open-circuit current of the actuator based on at least one of (i) a defined fixed parameter, (ii) a measured parameter, and (iii) a defined variable parameter based on different determined operating conditions, and estimating the reference point based on (i) an extrapolation of a variable that describes the process of releasing the automated parking brake, and (ii) the determined open-circuit current of the actuator.

2. The method as claimed in claim 1, the estimating the reference point further comprising:

estimating the reference point based on a linear extrapolation of the variable that describes the process of releasing the automated parking brake.

3. The method as claimed in claim 1, wherein the variable that describes the process of releasing the automated parking brake represents a reduction in clamping force.

4. The method as claimed in claim 1, wherein the variable that describes the process of releasing the automated parking brake includes at least one value pair of two variables, the two variables including a current value of the automated parking brake and a variable of the automated parking brake that describes a current position of the brake piston.

5. The method as claimed in claim 1, wherein the variable that describes the process of releasing the automated parking brake includes at least one value pair of two variables, the two variables including a current value of the automated parking brake and a time value of actuation of the actuator.

6. The method as claimed in claim 5 further comprising:
determining the at least one value pair of the two variables by one of (i) determining corresponding current values at defined time values and (ii) determining corresponding time values at defined current values.

7. The method as claimed in claim 4, the estimating the reference point further comprising:

estimating the reference point based on a linear extrapolation of two value pairs of the two variables that describe the process of releasing the automated parking brake.

8. The method as claimed in claim 1 further comprising:
assuming that the extrapolation of the variable that describes the process of releasing the automated parking brake has a defined reference value at the reference point at which the brake piston is located at the position between the idle position and the braking position that is essentially free of braking torque.

9. The method as claimed in claim 1 further comprising:
measuring, after complete elimination of the braking torque, an actually existing open-circuit current of the actuator; and correcting the estimated reference point in response to the open-circuit current determined before estimating the reference point deviating from the actually existing open-circuit current.

10. The method as claimed in claim 4, the estimating the reference point further comprising:

forming a mean value of a plurality of linear extrapolations of two value pairs of the two variables that describe the process of releasing the automated parking brake.

11. The method as claimed in claim 1 further comprising:
using the estimated reference point as an input variable for a calculation method to determine a precise reference point.

12. A device for operating an automated parking brake for a motor vehicle including at least one brake device having a brake piston, the device configured to:

adjust, with an actuator, the brake piston between an idle position that is free of braking torque and a braking position at which braking torque is applied to a brake disk; and determine, during a process of releasing the automated parking brake, a reference point at which the brake piston is located at a position between the idle position and the braking position that is essentially free of braking torque, wherein determining the reference point comprises determining an open-circuit current of the actuator based on at least one of (i) a defined fixed parameter, (ii) a measured parameter, and (iii) a defined variable parameter based on different determined operating conditions, and estimate the reference point based on (i) an extrapolation of a variable that describes the process of releasing the automated parking brake, and (ii) the determined open-circuit current of the actuator.

13. The device as claimed in claim 12, wherein the device is configured to execute a computer program to adjust the brake piston and to determine the reference point.

14. The device as claimed in claim 13, wherein the computer program is stored on a non-transitory machine-readable storage medium.

* * * * *